US008490188B2

(12) United States Patent
Kandek et al.

(10) Patent No.: US 8,490,188 B2
(45) Date of Patent: Jul. 16, 2013

(54) SYSTEMS AND METHODS FOR ASSESSING THE COMPLIANCE OF A COMPUTER ACROSS A NETWORK

(75) Inventors: Wolfgang Kandek, Redwood Shores, CA (US); Holger Kruse, San Mateo, CA (US); Tigran Gevorgyan, Redwood City, CA (US); Gregor Glawitsch, San Jose, CA (US); Parminder Singh, Santa Clara, CA (US); Kenneth K. Okumura, Sunnyvale, CA (US)

(73) Assignee: Qualys, Inc., Redwood Shores, CA (US)

( * ) Notice: Subject to any disclaimer, the term of this patent is extended or adjusted under 35 U.S.C. 154(b) by 465 days.

(21) Appl. No.: 12/580,982

(22) Filed: Oct. 16, 2009

(65) Prior Publication Data

US 2010/0175135 A1  Jul. 8, 2010

Related U.S. Application Data

(60) Provisional application No. 61/106,011, filed on Oct. 16, 2008.

(51) Int. Cl.
*G06F 11/00* (2006.01)

(52) U.S. Cl.
USPC .......................................................... 726/22

(58) Field of Classification Search
USPC ............................ 726/22, 23, 25, 24; 709/224
See application file for complete search history.

(56) References Cited

U.S. PATENT DOCUMENTS 6,324,656 B1    11/2001   Gleichauf et al.
2001/0034847 A1  10/2001   Gaul
2006/0191010 A1*  8/2006   Benjamin ....................... 726/23

OTHER PUBLICATIONS

PCT/US09/61065, International Search Report and Written Opinion mailed Dec. 7, 2009.

* cited by examiner

*Primary Examiner* — Samson Lemma
(74) *Attorney, Agent, or Firm* — Baker & McKenzie LLP

(57) ABSTRACT

The disclosed principles describe systems and methods for assessing the security posture of a target device, wherein the assessment is performed by a scanning computer in communication with the target device via a communication network. By employing a system or method in accordance with the disclosed principles, distinct advantages are achieved. Specifically, conducting such a remote scan allows for the scanner computer to perform a remote scan of the remote device without installing client software to the remote device. Thus, the disclosed principles reduce the need for internal IT resources to manage the deployment and updates of client software on the target device. Also, conducting a remote scan according to the disclosed principles allows for the remote scan to be performed even if the scanner computer and remote device run different operating systems.

30 Claims, 3 Drawing Sheets

SYSTEMS AND METHODS FOR ASSESSING THE COMPLIANCE OF A COMPUTER ACROSS A NETWORK

RELATED APPLICATIONS AND PRIORITY CLAIM

This application claims priority to U.S. Provisional Patent Application No. 61/106,011, filed Oct. 16, 2008, and which is commonly assigned with the present application in incorporated herein by reference in its entirety for all purposes.

TECHNICAL FIELD

Disclosed embodiments herein relate generally to electronic device security, and more particularly to systems and methods for remotely scanning a target device to perform an assessment of the device security.

BACKGROUND

Computer networks offer users ease and efficiency in exchanging information. Computer networks are typically comprised of integrated servers, routers, terminals and other components, interoperating and sharing information. Such networks manage a growing list of a variety of needs including transportation, commerce, energy management, communications, and defense.

Unfortunately, the very interoperability and sophisticated integration of technology that make computer networks such valuable assets also make them vulnerable to attack, and make dependence on networks a potential liability. Numerous examples of planned network attacks, such as viruses, worms, and spyware have shown how interconnectivity can be used to spread harmful program code. In addition, public or open network architectures, such as the Internet, permit hackers to have access to information on many different computers. These malicious attackers attempt to gain access to messages generated by a user's computer and to the resources of the user's computer, as well as to use knowledge regarding the operations of the protocol stack and operating systems of users' computers in an effort to gain access to their computers without authorization. Such illicit activity presents a significant security risk to any computer coupled to a network where a user for one computer may attempt to gain unauthorized access to resources on another computer of the network. Furthermore, organized groups have performed malicious and coordinated attacks against various large online targets.

When assessing the security posture of an endpoint device such as a computer terminal or workstation, scanning software is used to conduct tests for the existence of software components containing object code vulnerable to malicious attacks. For such security assessments, there are two methods for the runtime deployment of such scanning software. The first method is when the scanning software is deployed using a server in a client-server architecture. In this type of deployment, the scanning software conducts a network-based assessment of the target system, without any software installed on the endpoint computer device. Such a technique may be known as remote scanning The second method is when the scanning software is deployed on the local target system. In this type of deployment, the entire scanning software is a "thick client" installed on the local device that contains the scanning engine. Such a technique may be known as local scanning.

There are advantages and disadvantages associated with both methods of scanning The primary advantage of remote scanning is that it does not require software to be installed at the target local system. On the other hand, local scanning requires dedicated IT resources for managing the deployment and updates of client software on the endpoint devices. To this point in time, an additional limitation of remote scanning has been that the use of standard assessment software has required that the server be running the same operating system as the endpoint computer device. Otherwise, if the server and local target computer are running different operating systems, custom non-standard assessment software must be used to compensate for the incompatibility of the two different operating systems. Accordingly, what is needed is a technique for remotely assessing the security of a computer which allows standard assessment software written for one operating system to execute on a computer different from the one being assessed, without requiring any changes in the standard assessment software.

SUMMARY

Disclosed herein are methods and related systems for conducting a scan on a target device across a computer network. In one embodiment, such a method may comprise providing a scanner computer in communication with a communication network, providing a target device in communication with the communication network, and establishing a network connection between the scanner computer and the target device across the communication network. Such an exemplary method may also comprise loading a plurality of assessment rules into a memory location on the scanner computer. Also, the method may include requesting data items from the target device via function calls originating at a standard assessment library residing on the scanner computer, receiving the data items from the target device at the scanner computer via the communication network, and passing the data items to the standard assessment library. Then such a method may include analyzing the data items according to the plurality of assessment rules at the standard assessment library to assess a current posture of the target device.

In another embodiment, a system for conducting a scan on a target device across a computer network may be provided. In this exemplary embodiment, the system may comprise a scanner computer in communication with a communication network, wherein the scanner computer comprises a scanner engine, as well as a target device in communication with the communication network. In such an embodiment, the scanner engine could be configured to establish a network connection between the scanner computer and the target device across the communication network, and load a plurality of assessment rules into a memory location on the scanner computer. The scanner engine may also be configured to request data items from the target device via function calls originating at a standard assessment library residing on the scanner computer, receive the data items from the target device at the scanner computer via the communication network, and then pass the data items to the standard assessment library. The scanner engine may then analyze the data items according to the plurality of assessment rules at the standard assessment library to assess a current posture of the target device.

In a further embodiment, a method for conducting a scan on a target device across a computer network may be provide, and may comprise providing a scanner computer in communication with a communication network, wherein the scanner computer implements a first operating system, and providing a target device in communication with the communication network, wherein the target device implements a second operating system. Such a method may also include establishing a network connection between the scanner computer and the target device across the communication network, as well as loading a plurality of assessment rules by a standard assessment library into a memory location on the scanner computer, wherein the standard assessment library is designed to operate on the second operating system. The method may further include requesting data items from the target device via function calls originating at the standard assessment library, and adapting the function calls to conform with a network protocol supported by the target device, wherein adapting the function calls is performed by an adaptation layer. Then this exemplary method may include receiving the data items from the target device at the scanner computer via the communication network, wherein receiving the data items is controlled by a network transport layer, and then passing the data items to the standard assessment library. The method may then provide for analyzing the data items in accordance with the plurality of assessment rules at the standard assessment library to assess a current posture of the target device.

In yet another embodiment, a system for conducting a scan on a target device across a computer network may be provided, and may comprise a scanner computer in communication with a communication network, wherein the scanner computer implements a first operating system, and a target device in communication with the communication network, wherein the target device implements a second operating system. This embodiment of a system may then include a scanner engine residing on the scanner computer, wherein the scanner engine comprises an assessment runtime supervisor operable to establish a network connection between the scanner computer and the target device across the communication network, and a standard assessment library operable to load a plurality of assessment rules into a memory location on the scanner computer, and further operable to execute function calls requesting data items from the target device. The scanner engine may also include an adaptation layer operable to adapt the function calls to conform with a network protocol supported by the target device, and a network transport layer operable to receive the data items from the target device at the scanner computer via the communication network. Still further, a system according to this exemplary embodiment may have the assessment runtime supervisor further operable to pass the received data items to the standard assessment library, and the standard assessment library further operable to analyze the data items in accordance with the plurality of assessment rules to assess a current posture of the target device.

DETAILED DESCRIPTION

The disclosed principles describe a system and method for assessing the security posture of a target device, wherein the assessment is performed by a scanning computer in communication with the target device via a communication network. By employing a system or method in accordance with the disclosed principles, at least two distinct advantages are achieved. Specifically, conducting a remote scan according to the disclosed principles allows for the scanner computer to perform a remote scan of the remote device without installing client software to the remote device. Conducting a remote scan according to the disclosed principles reduces the need for internal IT resources to manage the deployment and updates of client software on the target device. A purely local scanner engine requires installation, activation and updating at the local level, whereas the approach of the disclosed principles eliminates such a requirement as well. Secondly, conducting a remote scan according to the disclosed principles allows for the remote scan to be performed even if the scanner computer and remote device run different operating systems. Further advantages of the disclosed principles will be discussed in connection with FIGS. 1-3.

Figure 1:
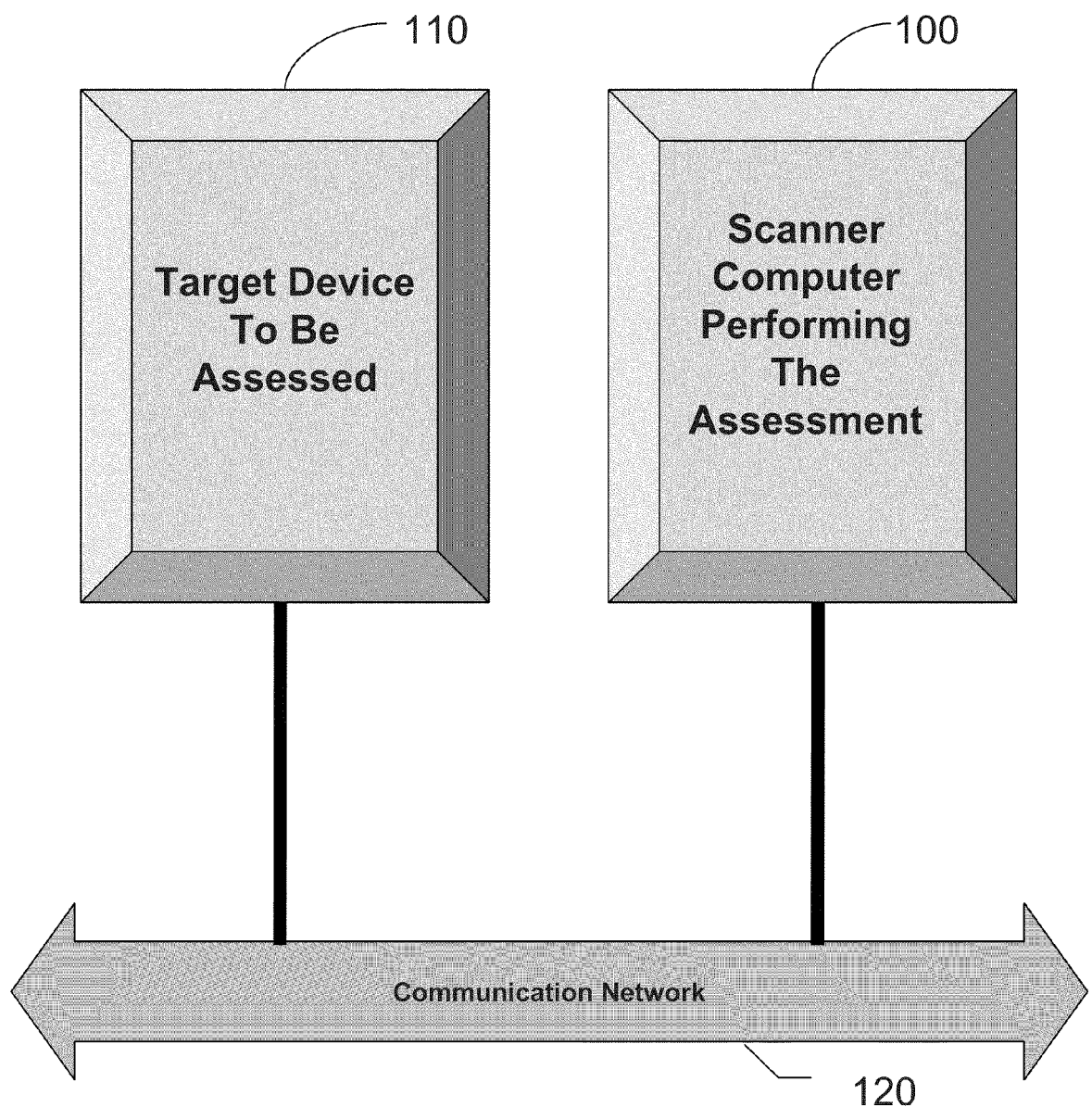
FIG. 1 illustrates a high level block diagram of one embodiment of a system constructed in accordance with the disclosed principles.

FIG. 1 illustrates one embodiment of the current application. As shown in FIG. 1, scanner computer 100 is connected to target device 110 via a communication network 120. The scanner computer 100 is where the scanning application program resides. The target device 110 can be any endpoint device connected to a network such as a computer or mobile communication device. The network 120 can be any network connecting two devices, such as a Local Area Network (LAN), Wide Area Network (WAN), or the Internet. One specific advantage of the disclosed principles is that the scanner computer 100 and the target device 110 do not have to be utilizing the same operating system to implement the scan and assessment provided in accordance with the disclosed principles. While a single target device 110 is illustrated in FIG. 1, the disclosed principles and techniques are of course expandable to multiple remote target devices 110.

Figure 2:
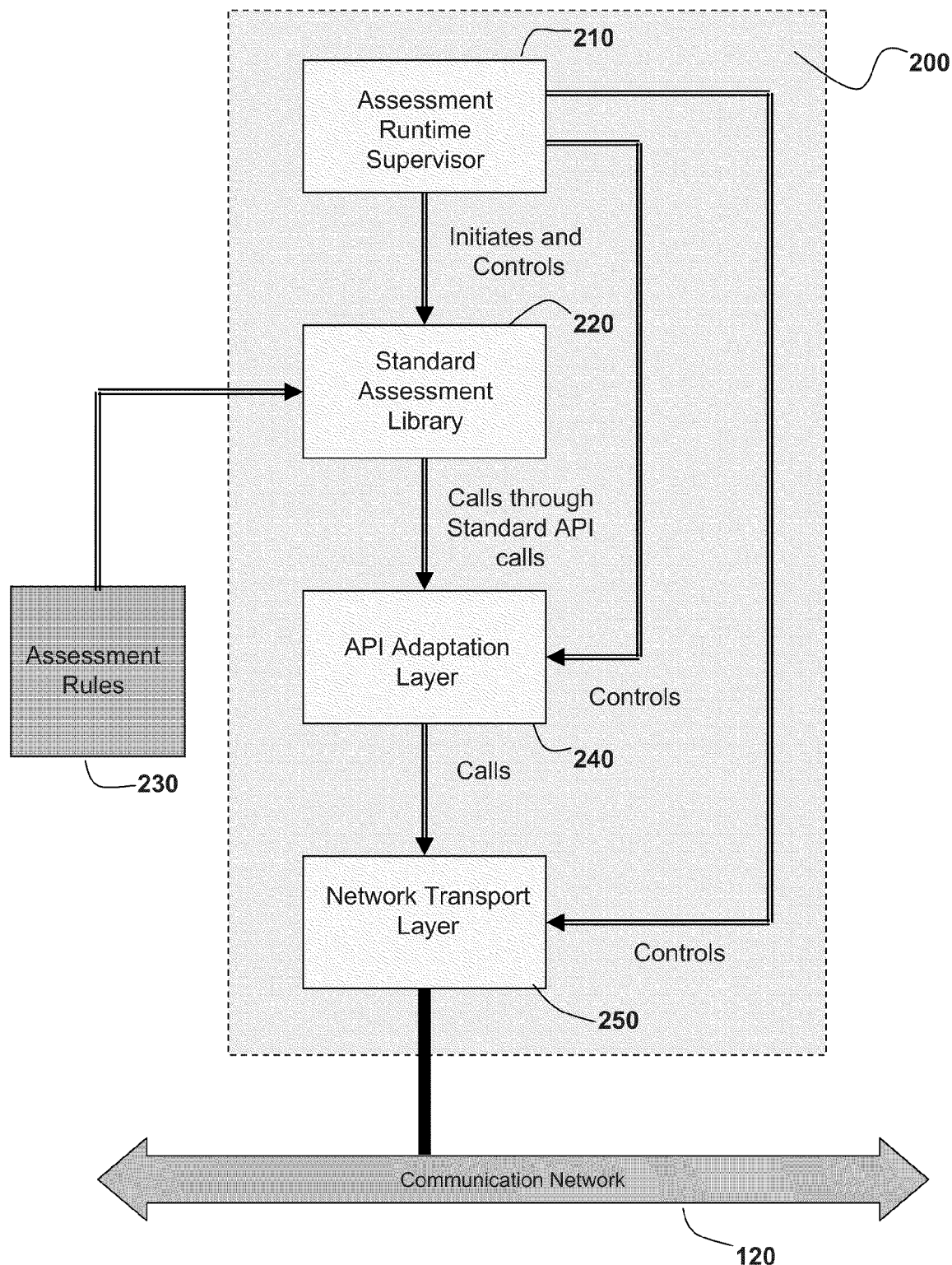
FIG. 2 illustrates a block diagram of one embodiment of the application program in accordance with the disclosed principles.

FIG. 2 illustrates exemplary components of the application program 200. In preparation for the assessment, the application program 200 is compiled and linked. More specifically, the application program 200 may be comprised of: the standard assessment library 220, the API adaptation layer 240, the network transport layer 250 and the assessment runtime supervisor 210. An advantageous component provided by systems and methods implemented according to the disclosed principles is the design of the API adaptation layer 240. More specifically, linker symbols typically required by the standard assessment library 220 to access operating system functions are emulated by the API adaptation layer 240. This allows the standard assessment library 220 to execute its assessment code on an operating system different from the one it was designed to run on.

The assessment runtime supervisor 210 controls the overall assessment. In an exemplary embodiment, the standard assessment library 220, in source code form, is designed to be run on the same operating system running on the target device 110. A set of assessment rules 230, which describe how the target computer or other device 110 is to be assessed, is input into the standard assessment library 220. The API adaptation layer 240 provides the services requested by the standard assessment library 220. The network transport layer 250 adapts the services provided by the API adaptation layer 240 to comply with a network protocol supported by the target device 110.

In preferred embodiments, the application program 200 is installed on the scanner computer 100, along with the assessment rules 230. The scanner computer 200 is then connected to the target device 110 via a computer network 120, as shown in FIG. 1. Of course, other configurations following the disclosed principles are also possible.

Figure 3:
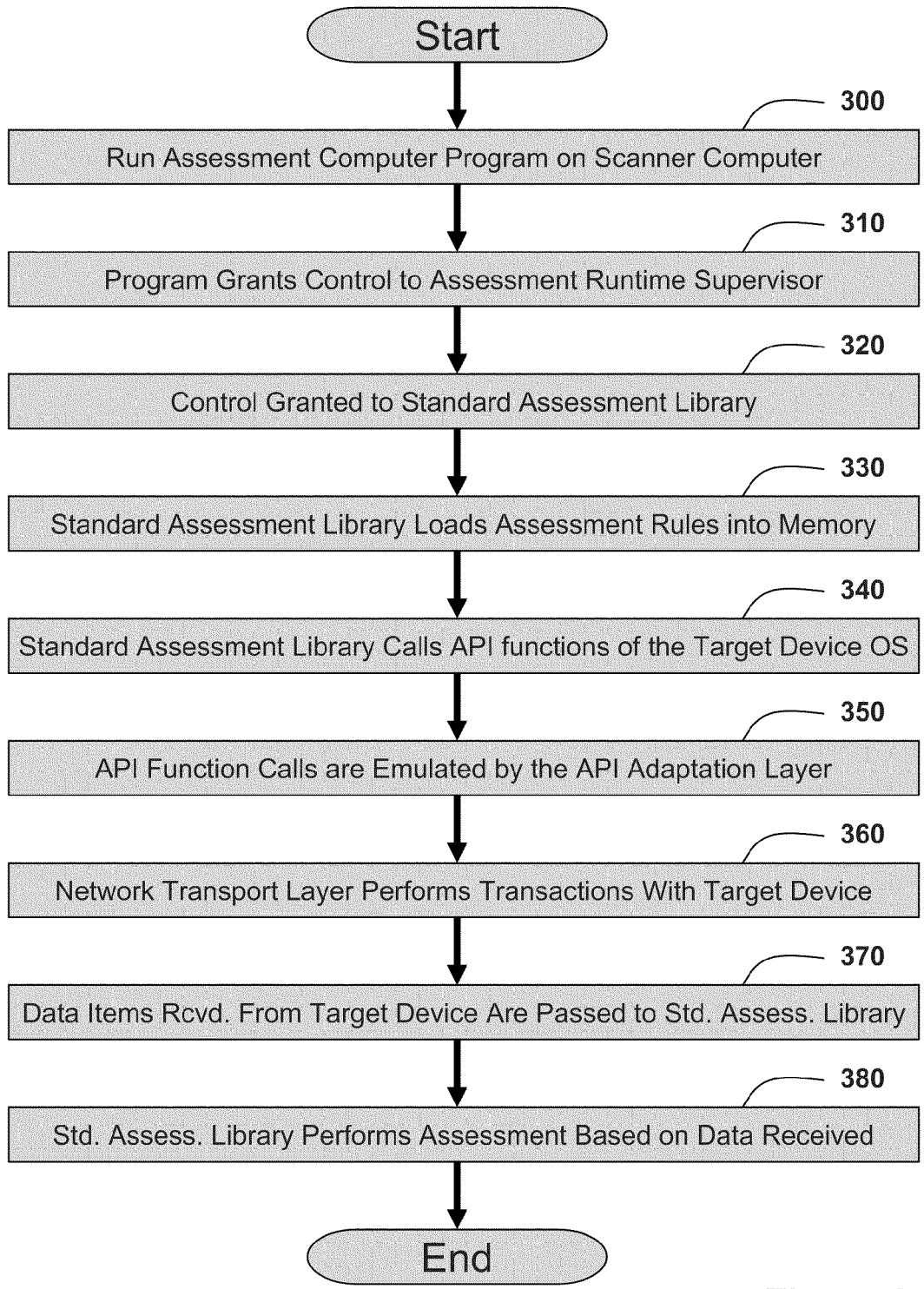
FIG. 3 illustrates a process flow diagram of an exemplary assessment of a target device conducted using the techniques of the disclosed principles.

Assessment of the target device 110 is performed as shown in the flowchart of FIG. 3. The application program 200 is started (step 300) on the scanner computer 100 and provided with the network address and login credentials of the target device 110. The application program 200 grants control to the assessment runtime supervisor 210 to set up the assessment environment and create a network connection to the target connection (step 310).

Control is then granted (step 320) to the standard assessment library 220 which loads the assessment rules 230 into memory (step 330) and starts executing the assessment of the target device 110. While doing so, it calls API functions (step 340) for the operating system of the target device 110 that operate to obtain data items required for the assessment. Those API function calls are emulated (step 350) by the API adaptation layer 240, which implements those API functions by converting them into function calls compatible with the network transport layer 250. The network transport layer 250 then performs network transactions (step 360) using the network API provided by the target computer 110.

The result of each network transaction is a data item which is passed back (step 370) to the standard assessment library 220, which uses the received data to perform the assessment (step 380). One benefit of this arrangement of layers is that the standard assessment library 220, which was originally designed to run directly on the target operating system and uses API calls of that system, can now be used for assessment on a different operating system without having to modify the standard assessment library 220 or the associated assessment rules 230.

As demonstrated by the above exemplary process, by employing a system or method in accordance with the disclosed principles, at least two distinct advantages are achieved over conventional remote scanning techniques. Specifically, conducting a remote scan according to the disclosed principles allows for the scanner computer to perform a remote scan of the remote target device without installing client software to the remote device. Therefore, conducting a remote scan according to the disclosed principles reduces the need for internal IT resources to manage the deployment and updates of client software on the target device. A purely local scanner engine requires installation, activation and updating at the local level, whereas the approach of the disclosed principles eliminates such a requirement.

Additionally, conducting a remote scan according to the disclosed principles allows for the remote scan to be performed even if the scanner computer and remote device run different operating systems. As described above, the function calls requesting the specific data from the target device(s) are emulated such that they are compatible with the operating system of the target device(s). Notably, this allows the scanner computer and its related components to run on an operating system more advantageous for server-based systems, while the target devices, which are typically client terminals, to run on operating systems more beneficial for local terminals. Moreover, even multiple target devices running operating systems different among each other may still be scanned and assessed using systems and methods implemented in accordance with the disclosed principles. Furthermore, the adaptation layer provides ability to optimize performance of the assessment process by enabling the implementation that uses this method to cache results of certain operations that produce static output, and provide cached results upon subsequent executions of these operations. Examples of such operations are various name lookups, enumerations of containers, various types of tree traversals (such as file system).

While various embodiments of the disclosed principles have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for conducting a scan on a target device across a computer network, the method comprising:
   providing a scanner computer in communication with a communication network;
   providing a target device in communication with the communication network;
   establishing a network connection between the scanner computer and the target device across the communication network;
   providing a standard assessment library on the scanner computer, the standard assessment library comprising functions, each function operable to run on one of a plurality of different operating systems;
   loading a plurality of assessment rules into a memory location on the scanner computer;
   calling functions operable on an operating system of the target device;
   requesting data items from the target device via the function calls;
   receiving the data items from the target device at the scanner computer via the communication network;
   passing the data items to the standard assessment library; and
   analyzing the data items according to the plurality of assessment rules at the standard assessment library to assess a current posture of the target device.

2. A method according to claim 1, further comprising providing an assessment runtime supervisor operable to establish the network connection between the scanner computer and the target device and set up an assessment environment between the scanner computer and the target device.

3. A method according to claim 1, wherein the function calls originated at the standard assessment library are adapted to conform with a network protocol supported by the target device.

4. A method according to claim 1, wherein an operating system of the scanner computer differs from the operating system of the target device.

5. A method according to claim 1, wherein the data items comprise current operating system information of the target device.

6. A method according to claim 5, wherein the operating system information includes system configuration information, system services information, or file system information.

7. A method according to claim 1, wherein assessing a current posture of the target device comprises determining a current security vulnerability posture of the target device.

8. A method according to claim 1, wherein the standard assessment library is operable on the target device operating system.

9. A system for conducting a scan on a target device across a computer network, the system comprising:
- a scanner computer in communication with a communication network, wherein the scanner computer comprises a scanner engine;
- a target device in communication with the communication network;
- wherein the scanner engine is configured to:
  - establish a network connection between the scanner computer and the target device across the communication network;
  - provide a standard assessment library on the scanner computer, the standard assessment library comprising functions, each function operable to run on one of a plurality of different operating systems;
  - load a plurality of assessment rules into a memory location on the scanner computer;
  - call functions operable on an operating system of the target device;
  - request data items from the target device via the function calls;
  - receive the data items from the target device at the scanner computer via the communication network;
  - pass the data items to the standard assessment library; and,
  - analyze the data items according to the plurality of assessment rules at the standard assessment library to assess a current posture of the target device.

10. A system according to claim 9, further comprising an assessment runtime supervisor operable to establish the network connection between the scanner computer and the target device and to setup an assessment environment between the scanner computer and the target device.

11. A system according to claim 9, wherein the function calls originated at the standard assessment library are adapted to conform with a network protocol supported by the target device.

12. A system according to claim 9, wherein an operating system of the scanner computer differs from the operating system of the target device.

13. A system according to claim 9, wherein the data items comprise current operating system information of the target device.

14. A system according to claim 13, wherein the operating system information includes system configuration information, system services information, or file system information.

15. A system according to claim 9, wherein assessing a current posture of the target device comprises determining a current security vulnerability posture of the target device.

16. A system according to claim 9, wherein the standard assessment library is operable on the target device operating system.

17. A system according to claim 9, wherein an assessment runtime supervisor controls the operation of the scanner engine.

18. A method for conducting a scan on a target device across a computer network, the method comprising:
- providing a scanner computer in communication with a communication network, wherein the scanner computer implements a first operating system;
- providing a target device in communication with the communication network, wherein the target device implements a second operating system;
- establishing a network connection between the scanner computer and the target device across the communication network;
- providing a standard assessment library on the scanner computer, the standard assessment library comprising functions, each function operable to run on one of a plurality of different operating systems;
- loading a plurality of assessment rules by the standard assessment library into a memory location on the scanner computer, wherein the standard assessment library resides on the scanner computer and wherein the standard assessment library is designed to operate directly on the second operating system;
- calling functions operable on the second operating system;
- requesting data items from the target device via the function calls;
- adapting the function calls to conform with a network protocol supported by the target device, wherein adapting the function calls is performed by an adaptation layer;
- receiving the data items from the target device at the scanner computer via the communication network, wherein receiving the data items is controlled by a network transport layer;
- passing the data items to the standard assessment library; and,
- analyzing the data items in accordance with the plurality of assessment rules at the standard assessment library to assess a current posture of the target device.

19. A method according to claim 18, further comprising providing an assessment runtime supervisor operable to establish the network connection between the scanner computer and the target device and to setup an assessment environment between the scanner computer and the target device.

20. A method according to claim 19, wherein the first operating system differs from the second operating system.

21. A method according to claim 19, wherein the data items comprise current operating system information of the target device.

22. A method according to claim 21 wherein the operating system information includes system configuration information, system services information, or file system information.

23. A method according to claim 19, wherein assessing a current posture of the target device comprises determining a current security vulnerability posture of the target device.

24. A method according to claim 19, wherein adapting the function calls is performed by an adaptation layer and wherein receiving the data items is controlled by a network transport layer.

25. A system for conducting a scan on a target device across a computer network, the system comprising:
- a scanner computer in communication with a communication network, wherein the scanner computer comprises a first operating system;

a target device in communication with the communication network, wherein the target device comprises a second operating system; and a scanner engine residing on the scanner computer, wherein the scanner engine comprises:

an assessment runtime supervisor operable to establish a network connection between the scanner computer and the target device across the communication network, a standard assessment library operable to load a plurality of assessment rules into a memory location on the scanner computer, and further operable to execute function calls requesting data items from the target device, wherein each function call is operable to run on one of a plurality of different operating systems to request the data items, an adaptation layer operable to adapt the function calls to conform with a network protocol supported by the target device, a network transport layer operable to receive the data items from the target device at the scanner computer via the communication network, wherein the assessment runtime supervisor is further operable to pass the received data items to the standard assessment library; and wherein the standard assessment library is further operable to analyze the data items in accordance with the plurality of assessment rules to assess a current posture of the target device.

26. A system according to claim 25, wherein the standard assessment library is operable on the second operating system.

27. A system according to claim 25, wherein the first operating system differs from the second operating system.

28. A system according to claim 25, wherein the data items comprise current operating system information of the target device.

29. A system according to claim 28, wherein the operating system information includes system configuration information, system services information, or file system information.

30. A method according to claim 25, wherein assessing a current posture of the target device comprises determining a current security vulnerability posture of the target device.

* * * * *